(12) United States Patent
Lu et al.

(10) Patent No.: US 11,658,837 B2
(45) Date of Patent: May 23, 2023

(54) MULTICAST PACKET REPLICATION METHOD

(71) Applicant: REALTEK SEMICONDUCTOR CORP., Hsinchu (TW)

(72) Inventors: Kuo-Cheng Lu, Hsinchu (TW); Mao-Lin Huang, Taoyuan (TW); Yung-Chang Lin, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 376 days.

(21) Appl. No.: 16/925,399

(22) Filed: Jul. 10, 2020

(65) Prior Publication Data
US 2022/0014391 A1    Jan. 13, 2022

(51) Int. Cl.
*H04L 12/18*    (2006.01)
*H04L 45/16*    (2022.01)
*H04L 69/22*    (2022.01)
*H04L 49/901*    (2022.01)

(52) U.S. Cl.
CPC .......... *H04L 12/1836* (2013.01); *H04L 45/16* (2013.01); *H04L 49/901* (2013.01); *H04L 69/22* (2013.01); *H04Q 2213/13353* (2013.01); *H04Q 2213/13547* (2013.01)

(58) Field of Classification Search
CPC ... H04L 12/1836; H04L 69/22; H04L 49/201; H04L 49/65; H04L 49/9057
See application file for complete search history.

(56) References Cited

U.S. PATENT DOCUMENTS

| 10,516,626 | B1* | 12/2019 | Kodeboyina | H04L 49/25 |
| 10,601,702 | B1* | 3/2020 | Cruz | H04L 45/16 |
| 2015/0085635 | A1* | 3/2015 | Wijnands | H04L 45/16 |
| | | | | 370/216 |
| 2016/0087809 | A1* | 3/2016 | Schmidt | G06F 16/27 |
| | | | | 370/390 |

(Continued)

FOREIGN PATENT DOCUMENTS

CN    105763457 A    *    7/2016

OTHER PUBLICATIONS

Bosshart, P., Daly, D., Izzard, M., McKeown, N., Rexford, J., Schlesinger, C., . . . Walker, D. (2013). Programming Protocol-Independent Packet Processors. doi:10.48550/ARXIV.1312.1719 (Year: 2013).*

*Primary Examiner* — Hitesh Patel
*Assistant Examiner* — Alex H. Tran
(74) *Attorney, Agent, or Firm* — Li & Cai Intellectual Property (USA) Office

(57) ABSTRACT

A replication list table structure for multicast packet replication is provided. The replication list table structure includes a plurality of entries. Each one of the plurality of entries includes a first field, a second field, a third field and a fourth field. For each one of the plurality of entries, the first field is used to declare whether the entry is an end of a program execution, the second field is used to declare the fourth field as a first type field for indicating a switch how to modify a header of a multicast packet, or as a second type field for indicating the switch, while reading the list, to jump to another one of the plurality entries, and the third field is preset to the first type field for indicating the switch how to modify the header of the multicast packet.

5 Claims, 11 Drawing Sheets

(56) References Cited

U.S. PATENT DOCUMENTS

| | | | |
|---|---|---|---|
| 2016/0191372 A1* | 6/2016 | Zhang | H04L 49/3009 |
| | | | 370/390 |
| 2017/0222920 A1* | 8/2017 | Thubert | H04L 45/16 |
| 2018/0278521 A1* | 9/2018 | Pfister | H04L 69/22 |
| 2019/0296922 A1* | 9/2019 | Dutta | H04L 12/1886 |
| 2020/0120013 A1* | 4/2020 | Goud Gadela | H04L 45/745 |

* cited by examiner

FIG. 2

| End | Mode | REP_ID0 | REP_ID1 |
|---|---|---|---|
| 1 | 0 | A | Null |
| 1 | 0 | B | C |
| 0 | 0 | A | B |
| 1 | 0 | C | D |
| | | | |
| | | | |

↑ {P0,Grp_idx=9}  ↑ {P1,Grp_idx=9}  ↑ {P2,Grp_idx=9}

FIG. 3A

| End | Mode | REP_ID0 | REP_ID1 |
|---|---|---|---|
| 1 | | | |
| 1 | 0 | A | Null |
| 0 | 0 | | |
| 1 | 0 | B | C |
| 0 | 0 | Null | E |
| 0 | 0 | A | B |
| 1 | 0 | C | D |
| | 0 | Null | E |
| | | | |

↑ {P0,Grp_idx=9}
↑ {P1,Grp_idx=9}
↑ {P2,Grp_idx=9}

FIG. 3B

MULTICAST PACKET REPLICATION METHOD

FIELD OF THE DISCLOSURE

The present disclosure relates to a list table structure, and more particularly to a replication list table structure for multicast packet replication.

BACKGROUND OF THE DISCLOSURE

Multicasting refers to simultaneous deliveries of packets to a plurality of receivers in a group. That is, for a switch, when an input port of the switch receives a multicast packet, and multiple receivers of a group requesting the multicast packet have multiple output ports coupled to the switch, the switch needs to send the multicast packet to these output ports, and a header of the multicast packet may need to be modified according to types of Layer 3 Logical Interface of the output.

In addition, because of an application of Virtual Local Area Network (VLAN), a physical output port on the switch may also belong to multiple VLANs. In this case, the switch will also send multiple packets with different headers from the physical output port. Therefore, for the multicast packet, the switch will decide to replicate several packets with different headers at a certain one of the output ports according to the replication list (RPL) table, and this action is called packet replication. For example, reference is made to FIGS. 1A to 1D, which are schematic diagrams of existing RPL table structures.

In the existing RPL table structure, an indicator is generated for output ports that coupled to multiple receivers of each group to direct to an entry of the RPL table, and the entry of FIG. 1A includes fields of REP_ID and Next_ptr. The field of REP_ID is used to indicate the switch how to modify the header of the multicast packet, and the field of Next_ptr is used to indicate whether the switch needs to read the REP_ID field of other entries. For example, when the field of Next_ptr is Null, the switch does not need to read the field of REP_ID of other entries, or the field of Next_ptr being Null represents an end of a list. In addition, for the field of Next_ptr indicating that the switch needs to read the field of REP_ID of the other entries, FIGS. 1A to 1D only use the lines with arrows to indicate an entry indicated by the field of Next_ptr for the switch to read the field of REP_ID therein. Therefore, the switch can read the field of REP_ID of the entry one by one to realize how many packets need to be replicated, and how to modify the header of each packet.

For the convenience of the following description, a case that multiple receivers of a group Grp_idx=9 being coupled to output ports P0, P1 and P2, and indicators {P0, Grp_idx=9}, {P1, Grp_idx=9} and {P2, Grp_idx=9} being generated is only taking as an example herein. Therefore, taking the indicator {P2, Grp_idx=9} as an example, the switch can read entries of a list indicated by the indicator one by one, thereby realizing that a total of four packets must be replicated, or realizing that these four packets must be sent from the output port P2, and also realizing that headers of these four packets should be modified according to indications of the fields of REP_ID being A, B, C, and D, respectively. For example, the field of REP_ID being "A" may indicate that VLAN ID and Source MAC Address in the packet header to be modified as 100 and 0x000102030405, respectively, while the field of REP_ID being "B" may indicate that VLAN ID and Source MAC Address in the packet header to be modified to 200 and 0x000102888888, respectively. In summary, when these four packets need to be replicated for the output port P2, a RPL table of FIG. 1A needs to consume four fields of REP_ID and four fields of Next_ptr, resulting in poor usage efficiencies.

In addition, compared to the entries of FIG. 1A, entries of FIG. 1B include a plurality of fields, for example, two fields of REP_ID: REP_ID0 and REP_ID1. Therefore, when these four packets need to be replicated for the output port P2, the RPL table of FIG. 1B consumes two fields of Next_ptr, which is less than the RPL table of FIG. 1A, such that the usage efficiency of the RPL table is improved. However, when a packet needs to be replicated for the output port P0, the RPL table of FIG. 1B consumes one more field of REP_ID than the RPL table of FIG. 1A, that is, a field of REP_ID1 field is Invalid. It can be seen that, in the case where the number of replication packets is different, the RPL table structure of FIG. 1A and the RPL table structure of FIG. 1B will each have advantages and disadvantages.

Finally, the existing RPL table structures can also support entry-sharing to improve the usage efficiency of the RPL tables. As shown in FIGS. 1C and 1D, after the fields of REP_ID being B and C are properly configured, they will be able to be shared by the entries indicated by the indicators {P1, Grp_idx=9} and {P2, Grp_idx=9}. However, these shared fields of REP_ID can only be placed at the end of the list, and can only be shared at the end for each list. In other words, there are limitations for entry-sharing in the existing RPL table structure. Therefore, designing a new RPL table structure to improve the usage efficiency of RPL tables and reduce the limitations of entry-sharing becomes an important topic in the art.

SUMMARY OF THE DISCLOSURE

In response to the above-referenced technical inadequacies, the present disclosure provides a replication list table structure for multicast packet replication, and the replication list table structure includes a plurality of entries. Each one of the plurality of entries includes a first field, a second field, a third field and a fourth field. For each one of the plurality of entries, the first field is used to declare whether the entry is an end of a program execution, the second field is used to declare the fourth field as a first type field for indicating a switch how to modify a header of a multicast packet, or as a second type field for indicating the switch, while reading a list, to jump to another one of the plurality entries, and the third field is preset to the first type field for indicating the switch how to modify the packet header.

Preferably, for each one of the plurality of entries, when the second field declares the fourth field as the first type field, the fourth field is used to indicate the switch how to modify the header of the multicast packet, and when the first field declares that the entry is not the end of the program execution, the entry and a next entry next to the entry are regarded as one list, such that the switch is further configured to continue to modify the header of the multicast packet according to the first through fourth fields of the next entry.

Preferably, for each one of the plurality of entries, when the second field declares the fourth field as the second type field, the fourth field is used for indicating the switch, while reading the list, to jump to the another one of the plurality of entries indicated by a content of the fourth field, such that the switch is further configured to continue to modify the header of the multicast packet according to the first through fourth fields of the another one of the plurality of entries.

Preferably, for each one of the plurality of entries, the second field is further used to declare the fourth field as a third type field for indicating the switch, while reading the list, to call the another one of the plurality of entries. Preferably, when the second field declares the fourth field as the third type field, the fourth field is used to indicate the another one of the plurality of entries indicated by the content of the fourth field that the switch calls while reading the list, such that the switch is configured to continue to modify the header of the multicast packet according to the first through fourth fields of the another one of the plurality of entries, and when the program execution ends, the switch returns, while reading the list, to the next entries immediately next to the entry, such that the switch is further configured to continue to modify the header of the multicast packet according to the first through fourth fields of the next entry.

Preferably, for each one of the plurality of entries, the second field is further used to declare the third field and the fourth field as the third type field and the second type field, respectively. Preferably, when the second field declares the third field and the fourth field as the third type field and the second type field, respectively, the third field is used to indicate the another one of the plurality of entries indicated by a content of the third field that the switch calls while reading the list, such that the switch will continue to modify the header of the multicast packet according to the first through fourth fields of the another one of the plurality of entries indicated by the content of the third field, and when the program execution ends, the switch jumps, while reading the list, to the another one of the plurality of entries indicated by the content of the fourth field, such that the switch is further configured to continue to modify the header of the multicast packet according to the first through fourth fields of the another one of the plurality of entries indicated by the content of the fourth field.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

FIG. 2 is a schematic diagram of an RPL table structure provided by an embodiment of the present disclosure.

FIGS. 3A and 3B are schematic diagrams of the RPL table structure of FIG. 2 in a first preferred application.

DETAILED DESCRIPTION OF THE EXEMPLARY EMBODIMENTS

Figure 1A:
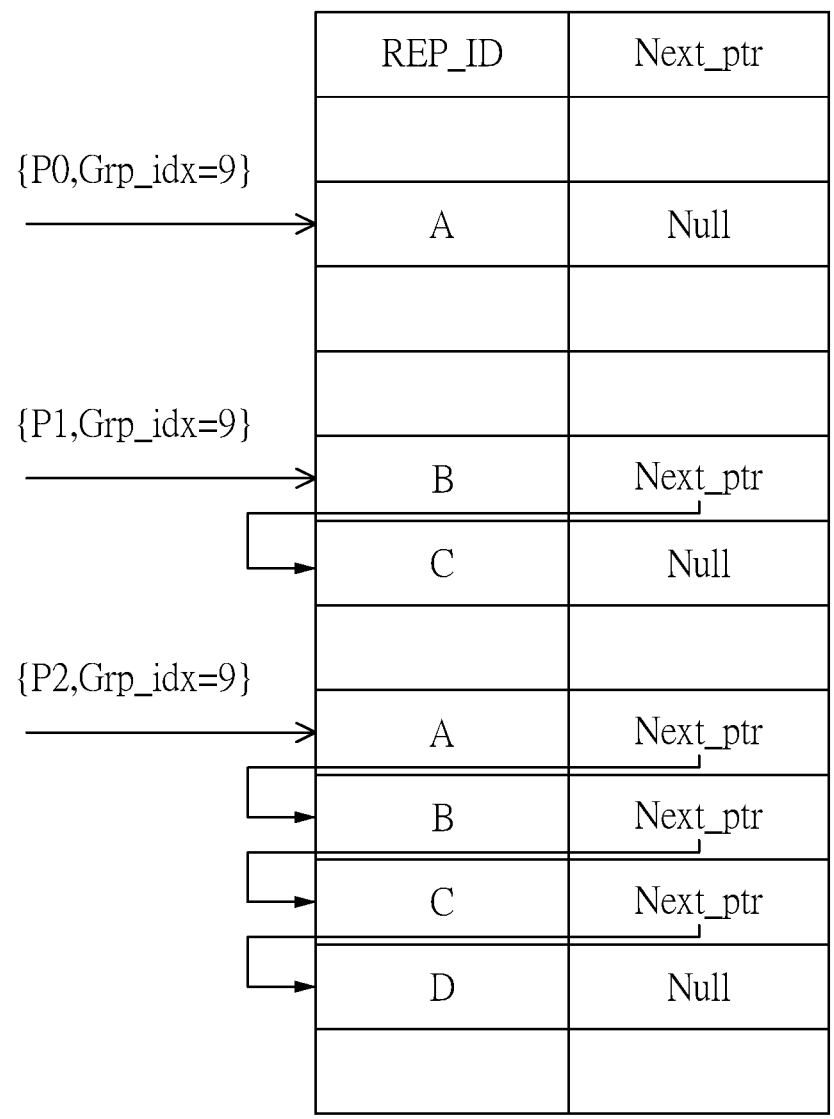
FIGS. 1A to 1D are schematic diagrams of existing RPL table structures, respectively.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
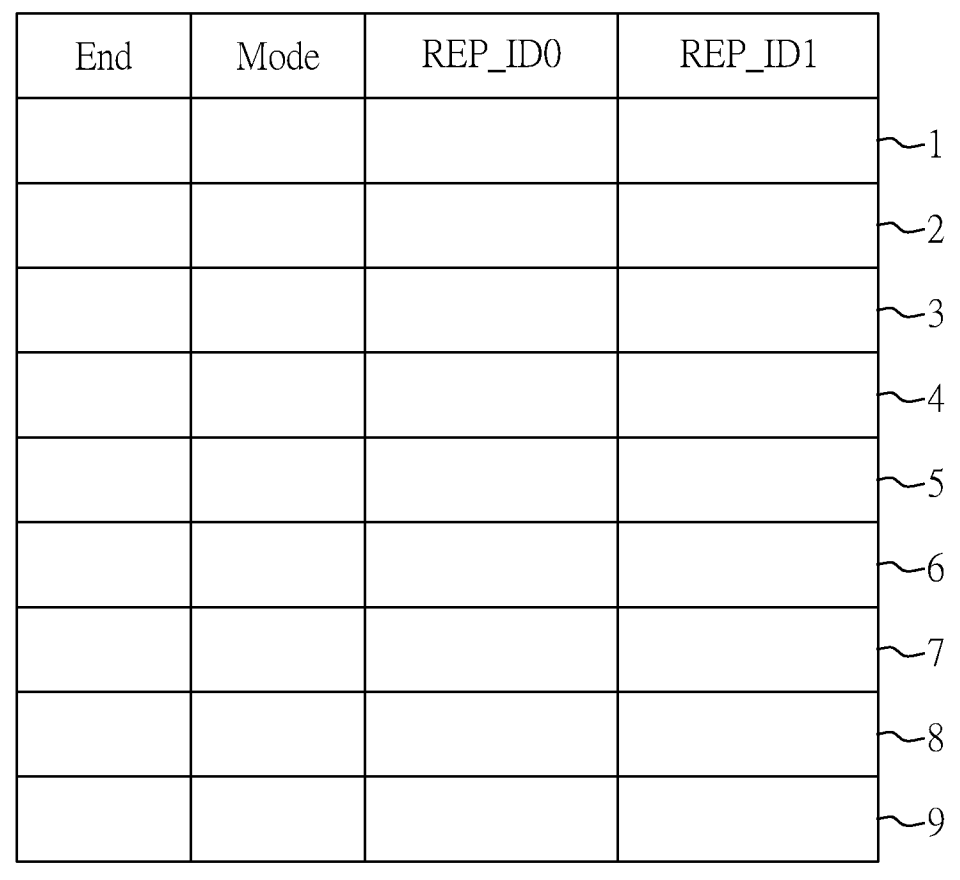

Reference is made to FIG. 2, which is a schematic diagram of an RPL table structure provided by an embodiment of the present disclosure. As shown in FIG. 2, the RPL table structure includes a plurality of entries, such as entry 1 to entry 9, and each entry includes four fields of End, Mode, REP_ID0, and REP_ID1. For each one of the plurality of entries, the field of End is used to declare whether the entry is an end of a program execution, the field of Mode is used to declare the field of REP_ID1 as a first type field for indicating a switch how to modify a header of a multicast packet, or as a second type field for indicating the switch, while reading a list, to jump to another one of the plurality entries, and the field REP_ID0 is preset to the first type field for indicating the switch how to modify the header of the multicast packet. For the convenience of the following description, the present embodiment only uses the field of End being 0 to indicate that the entry is declared as not an end of a program execution, and uses the field of End being 1 to indicate that the entry is declared as the end of the program execution, but the present disclosure is not limited thereto. Similarly, the present embodiment merely uses the field of Mode being 0 or 1 to indicate that the field of REP_ID1 is declared as the first type field or the second type field, but the present disclosure is not limited thereto. Therefore, reference is made to FIGS. 3A and 3B. FIGS. 3A and 3B are schematic diagrams of the RPL table structure of FIG. 2 in a first preferred application.

As shown in FIG. 3A, again taking the list indicated by the indicator {P2, Grp_idx=9} as an example, the present embodiment can place an entry 6 in which the fields of REP_ID0 and REP_ID1 being "A" and "B" and an entry 7 in which the fields of REP_ID0 and REP_ID1 being "C" and "D" to be close to each other, and the fields of Mode of the entries 6 and 7 are set to 0, but the field of End of entries 6 and 7 are set to 0 and 1, respectively. In this way, the switch can regard the adjacent entries 6 and 7 as one list, thereby realizing that a total of four packets should be sent from the output port P2, and also realizing that the headers of these four packets should be modified according to indications of the fields of REP_ID0 being "A" and "C" and REP_ID1 being "B" and "D", respectively. That is, for each of these entries, when the field of Mode declares the field of REP_ID1 as the first type field, the field of REP_ID1 is used to indicate the switch how to modify the header of the multicast packet, and when the field of End declares that the current entry is not the end of the program execution, the current entry and a next entry immediately next to the current entry are regarded as the list, such that the switch is further configured to continue to modify the header of the multicast packet according to the four fields of the next entry.

Figure 4A:
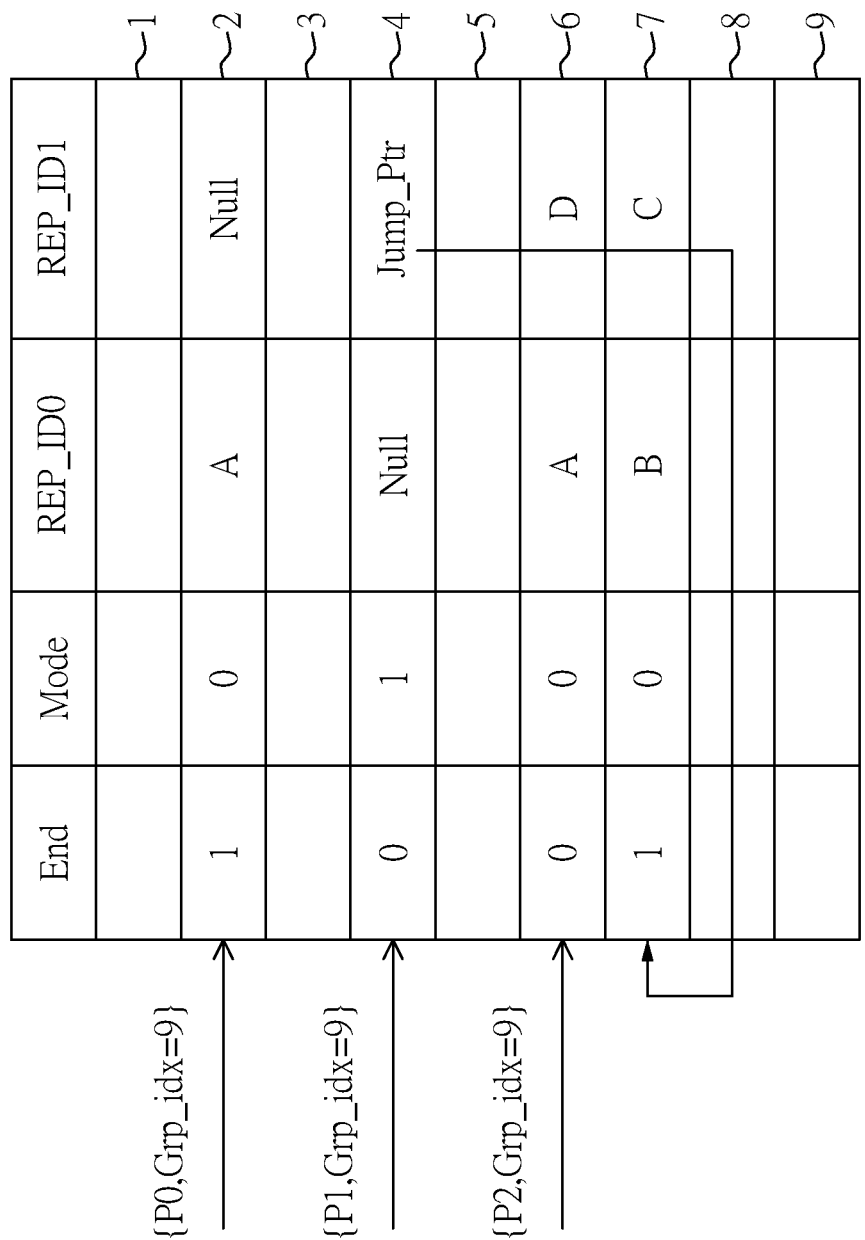
FIGS. 4A and 4B are schematic diagrams of the RPL table structure of FIG. 2 in a second preferred application.
Figure 4B:
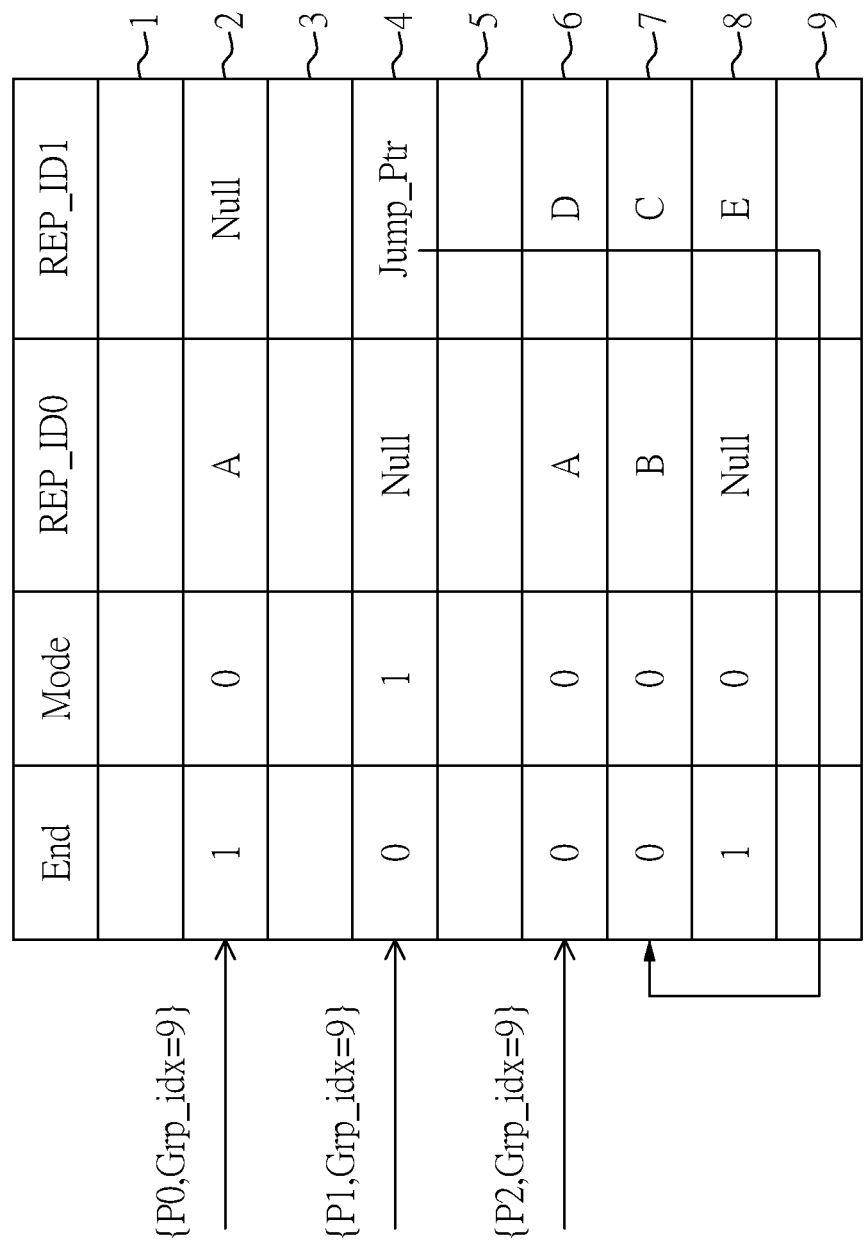

In addition, when the output ports do not have so many packets with different headers to be sent, or there is a cancellation for a delivery of a packet with a different header, the fields of REP_ID0 and REP_ID1 can also be Null. In a word, each entry in the present embodiment can indicate modification manners for two headers at most, and compared with the existing RPL table structure, since the current entry and the next entry immediately next to the current entry can be regarded as one list, the present embodiment may not need the field of Next_ptr, but the field of End is required to declare the end of the program execution. Then, if the next entry cannot be found, the field of Mode can also declare the field of REP_ID1 as the second type field to indicate the switch, while reading the list, to jump to another entry. For example, the present embodiment uses Jump_ptr to represent, and for the convenience of the following description, the present embodiment also only uses a line with an arrow to indicate which entry that Jump_ptr indicates for the switch to jump while reading the list. Therefore, reference is made to FIGS. 4A and 4B. FIGS. 4A and 4B are schematic diagrams of the RPL table structure of FIG. 2 in a second preferred application.

As shown in FIG. 4A, since the fields of REP_ID0 and REP_ID1 being "B" and "C" can be shared by the list indicated by the indicators {P1, Grp_idx=9} and {P2, Grp_idx=9}, therefore, the present embodiment can place the entry 7 in which the fields of REP_ID0 and REP_ID1 being "B" and "C" to the last entry of the list indicated by the indicator {P2, Grp_idx=9}, that is, the field of End of the entry 7 is set to 1, and the fields of End and Mode an of entry 4 indicated by the indicator {P1, Grp_idx=9} are set to 0 and 1, respectively, such that the REP_ID1 field is used as Jump_ptr to indicate the switch, while reading the list indicated by the indicator {P1, Grp_idx=9}, to jump to the entry 7. That is, for each of these entries, when the field of Mode declares the field of REP_ID1 as the second type field, the field of REP_ID1 is used to indicate the switch, while reading the list, to jump to another entry indicated by the content of the field of REP_ID1 field, such that the switch is further configured to continue to modify the header of the multicast packet according to the four fields of the another entry.

In addition, in order to further explain operation principle of Jump_ptr, FIG. 3B and FIG. 4B are modified to cases that the output ports P1 and P2 need to send an additional packet whose header being modified according to the indication of the field of REP_ID1 being "E". Therefore, compared to FIG. 4A, the present embodiment places the entry 8 in which the fields of REP_ID0 and REP_ID1 being "Null" and "E" to the last entry of the list indicated by the indicator {P2, Grp_idx=9}, i.e., the field of End of the entry 8 is set to 1, and the field of End of the entry 7 is changed to 0, and the fields of End and Mode of the entry 4 indicated by the indicator {P1, Grp_idx=9} are still set to "0" and "1", respectively, such that the field of REP_ID1 is used as Jump_ptr to indicate the switch to jump to the entry 7 while reading the list indicated by the indicator {P1, Grp_idx=9}.

In this way, compared to the indicators {P1, Grp_idx=9} and {P2, Grp_idx=9} of FIG. 3B, the indicators {P1, Grp_idx=9} and {P2, Grp_idx=9} of FIG. 4B consume one entry less.

Figure 1B:
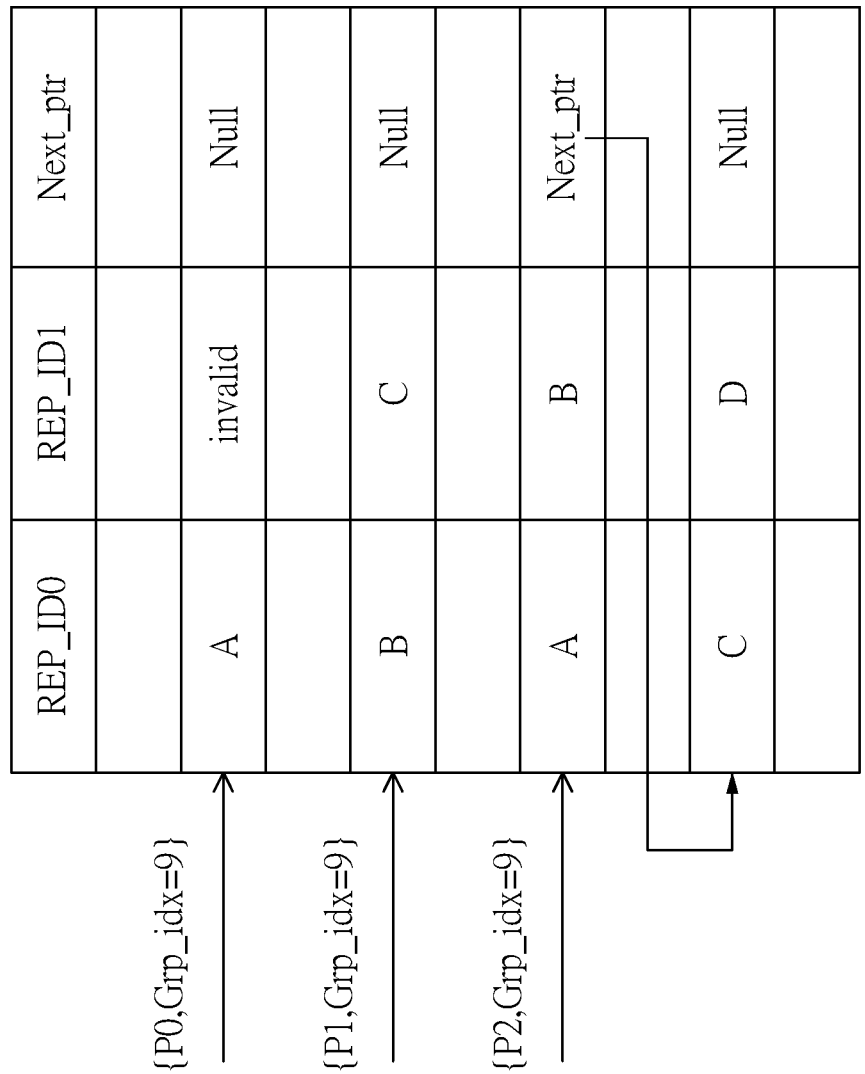
Figure 1C:
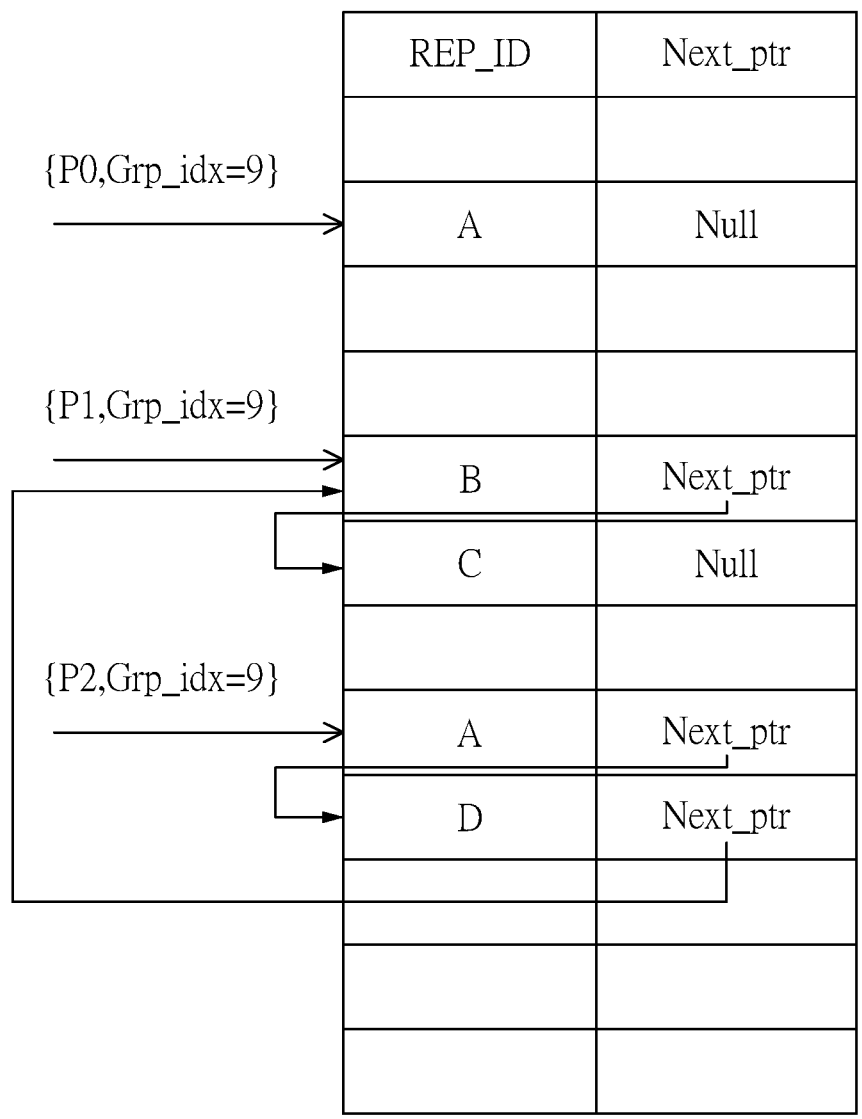
Figure 1D:
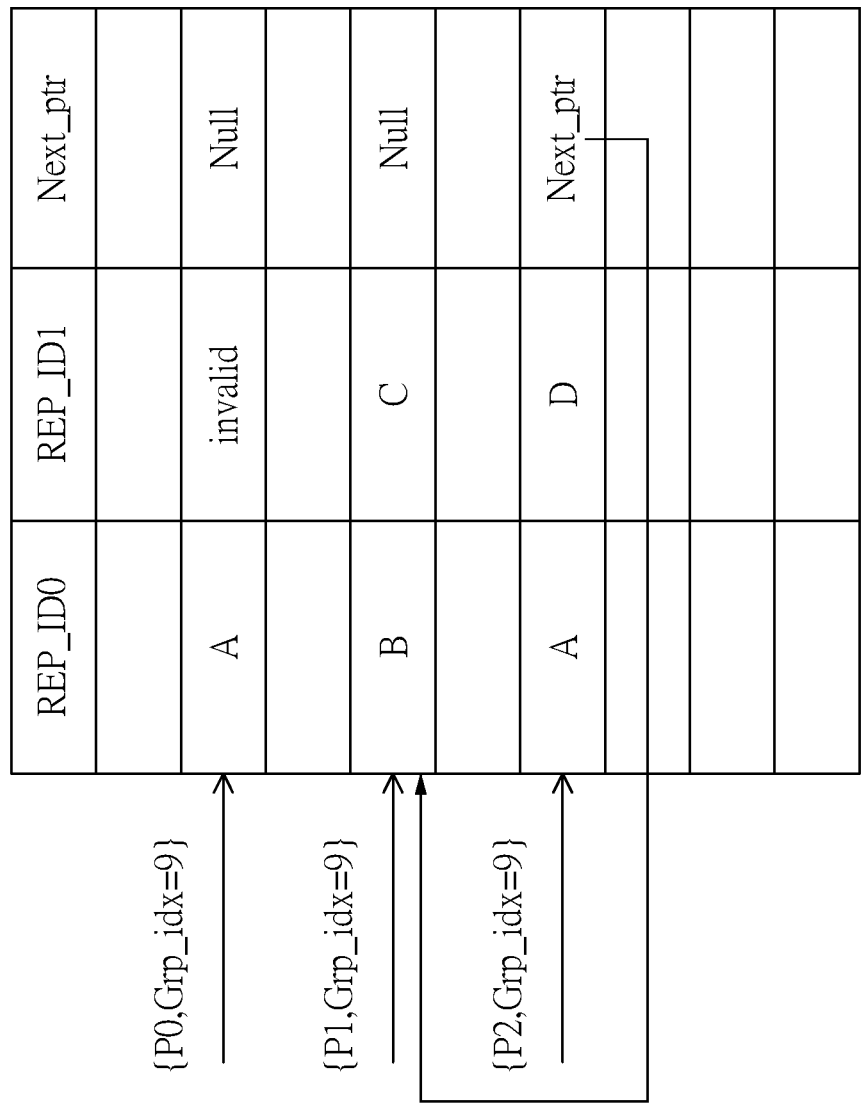

It can be seen that when more packets are to be copied for an output port, the embodiment can configure the current entry and the next entry immediately next to the current entry as one list, and can make the field of REP_ID1 as Jump_ptr to instruct the switch to jump to another entry while reading the list, therefore, compared with the existing RPL table structure, the present embodiment can save space costs caused by the field of Next_ptr. For example, when the number of replication packets is large, compared to the RPL table structure of FIG. 1A, the RPL table structure of the present embodiment can save approximately 50% of the space of field, and compared to the RPL table structure of FIG. 1B, the RPL table structure of the present embodiment can also save about 33% of space of field. In addition, when fewer packets are copied for certain output port, the usage efficiency of the RPL table structure in the present embodiment is better than the usage efficiency of the RPL table structures of FIGS. 1A and 1B.

Figure 5:
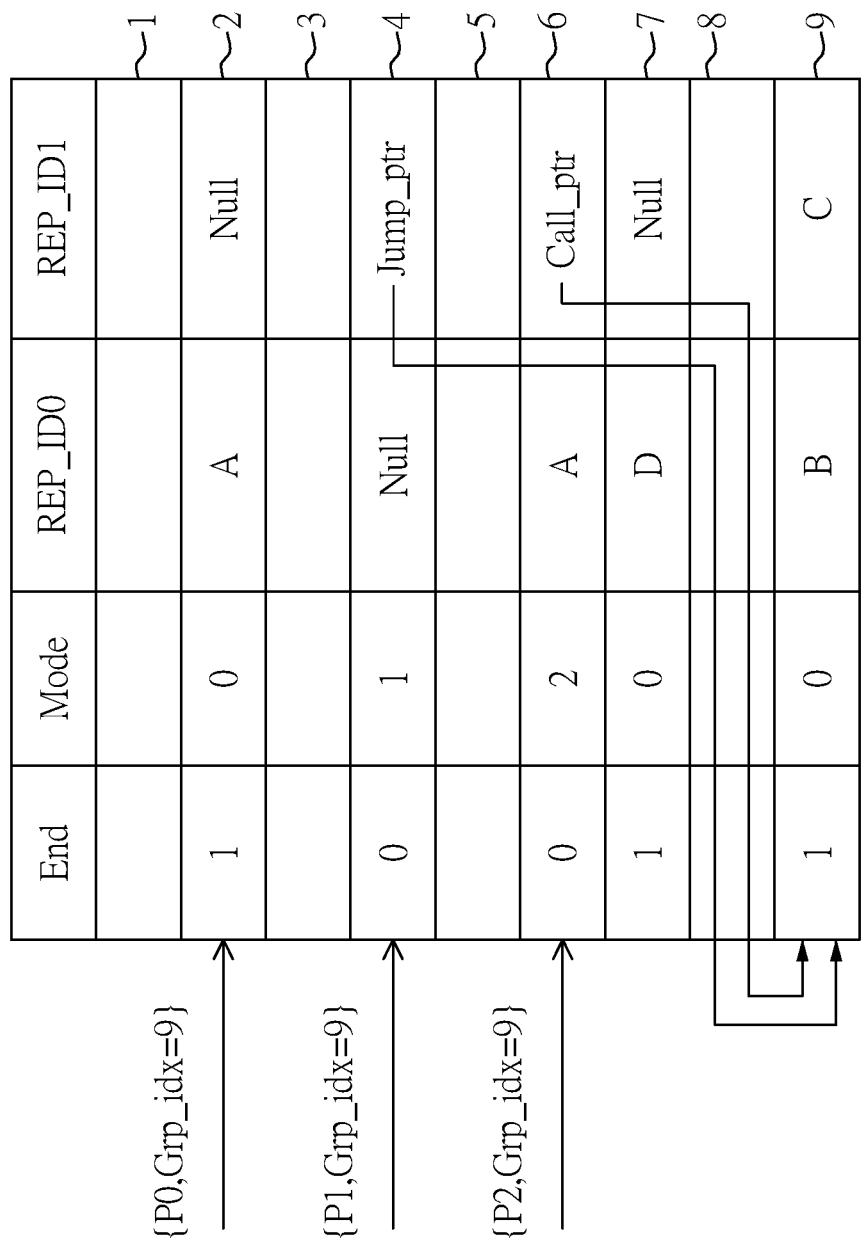
FIG. 5 is a schematic diagram of the RPL table structure of FIG. 2 in a third preferred application.

On the other hand, in order to reduce the limitations on entry-sharing, for each one of these entries, the field of Mode can also be used to declare the field of REP_ID1 as a third type field for indicating the switch, while reading the list, to call another entry. For example, the present embodiment uses Call_ptr for representation, and for the convenience of the following description, the present embodiment also only uses a line with an arrow to indicate which entry that Call_ptr indicates for the switch while reading the list. It should be noted that Call_ptr is equivalent to "Function call" in programming, therefore, when a function ends, that is, the execution of the program ends, a return address should be a next entry immediately next to the entry calling the function. Similarly, the present embodiment only uses the field of Mode being 2 to indicate that the field of REP_ID1 is declared as the third type field, but the present disclosure is not limited thereto. Therefore, reference is made to FIG. 5, and FIG. 5 is a schematic diagram of the RPL table structure of FIG. 2 in a third preferred application. It should be noted that in order to facilitate the following description, FIG. 5 is modified back to the example where the output ports P1 and P2 need to send two and four packets, respectively.

As shown in FIG. 5, again taking the list indicated by the indicator {P2 Grp_idx=9} as an example, the switch can first read the field of REP_ID0 of the entry 6 to be "A", and then read the fields of REP_ID0 and REP_ID1 of the entry 9 to be "B" and "C" according to Call_ptr of the entry 6, and since the field of End of the entry 9 is 1, representing the end of the program execution, therefore, the switch returns, according to the list indicated by the indicator {P2, Grp_idx=9}, to a next entry immediately next to the entry 6, that is, the entry 7 with the field of REP_ID0 being "D". That is, for each of these entries, when the field of Mode declares the field of REP_ID1 as the third type field, the field of REP_ID1 is used to indicate the switch, while reading the list, to call the another entry indicated by a content of the field of REP_ID1 field, such that the switch is further configured to continue to modify the header of the multicast packet according to the four fields of the another entry, and when the program execution ends, the switch returns, while reading the list, to the next entry immediately next to the current entry, such that the switch is further configured to continue to modify the header of the multicast packet according to the four fields of the next entry.

Figure 6:
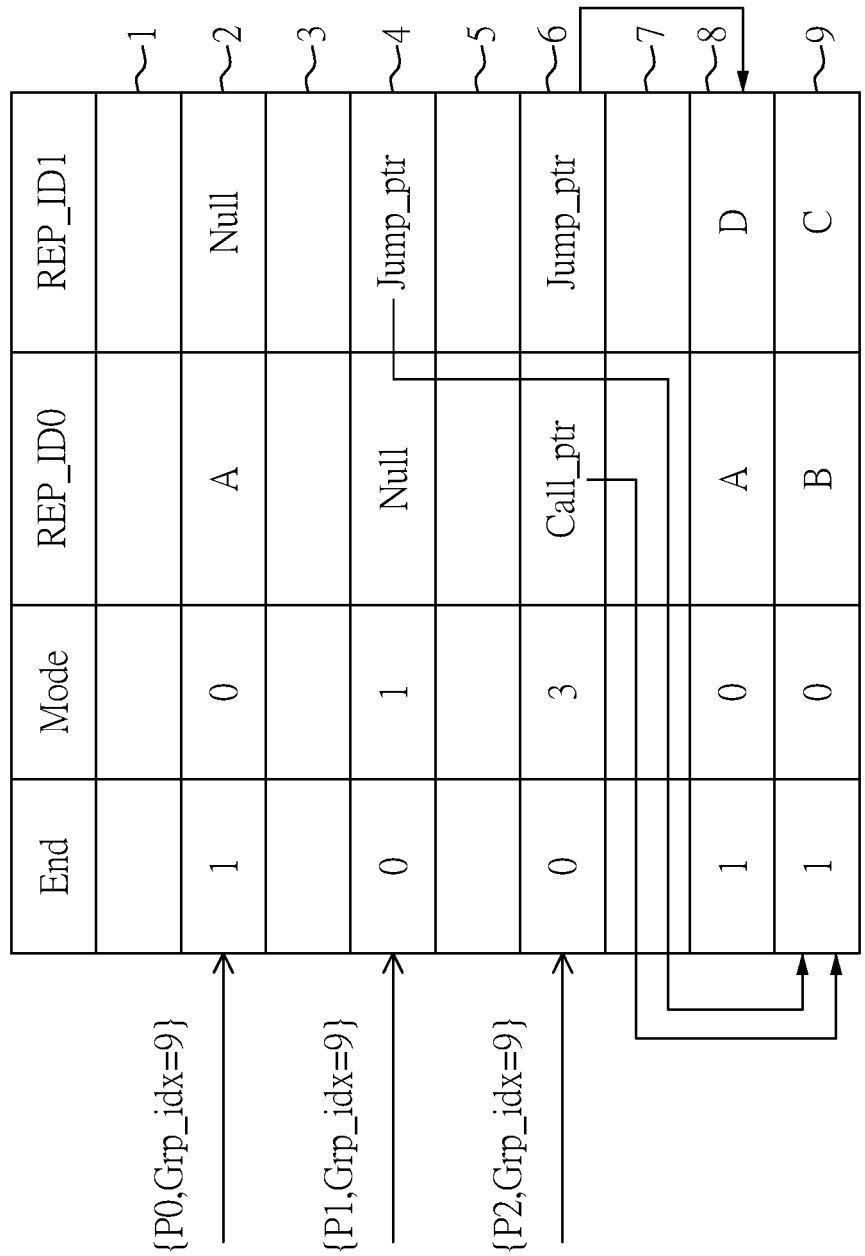
FIG. 6 is a schematic diagram of the RPL table structure of FIG. 2 in a fourth preferred application.

It can be seen that, compared to the existing RPL table structure, a shared field in the present embodiment does not need to be placed at the end of the list, and each list does not need to be shared only at the end of the list. In addition, the present embodiment does not limit the field of Mode can only declare the field of REP_ID1 for other purposes. For example, for each of these entries, the field of Mode can be used to declare the fields of REP_ID0 and REP_ID1 as the third type field and the second type field, respectively. In order to facilitate the following description, the present embodiment only uses the field of Mode being 3 to indicate that the fields of REP_ID0 and REP_ID1 field are declared as the third type field and the second type field, respectively, i.e., Call_ptr and Jump_ptr, but the present disclosure is not limited thereto. Therefore, reference is made to FIG. 6, and FIG. 6 is a schematic diagram of the RPL table structure of FIG. 2 in a fourth preferred application.

As shown in FIG. 6, again taking the list indicated by the indicator {P2,Grp_idx=9} as an example, the switch can first read the fields of REP_ID0 and REP_ID1 of the entry 9 being "B" and "C", respectively, according to Call_ptr of the entry 6, but when the switch returns while reading the list indicated by the indicator {P2, Grp_idx=9}, the switch then jump to the entry 8 in which the fields of REP_ID0 and REP_ID1 being "A" and "D" according to the Jump_ptr of the entry 6. That is to say, for each of these entries, when the field of Mode declares the fields of REP_ID0 and REP_ID1 as the third type field and the second type field, respectively, the field of REP_ID0 is used to indicate the switch, while reading list, to call another entry indicated by a content of the field of REP_ID0, such that the switch is further configured to continue to modify the header of the multicast packet according to the four fields of the another entry indicated by the content of the field of REP_ID0, and when the program execution ends, the switch jumps, while reading the list, to the another entry indicated by the content of the field of REP_ID1, such that the switch is configured to continue to modify the header of the multicast packet according to the four fields of the another entry indicated by the content of the field of REP_ID1.

Simply, each one of the entries of the RPL table structure can include at least one field of REP_ID, and the at least one field of REP_ID is originally used to indicate the switch how to modify the header of the multicast packet, but each one of the entries in the present embodiment further includes the field of Mode to declare the at least one field of REP_ID for other purposes. As mentioned above, according to the declaration of the field of Mode, the field of REP_ID can be used as Jump_ptr to indicate the switch to jump to another entry while reading the list, or as Call_ptr to indicate the switch to call another entry while reading the list. Since the relevant details are as described above, repeated descriptions are omitted hereinafter. In short, the present embodiment can arbitrarily combine a plurality of fields REP_ID with different uses in one entry, or a plurality of fields of REP_ID with same purpose can also be placed in one entry to achieve the packet replication that the switch completes for the output port. In addition, according to the foregoing teachings, those skilled in the art should understand that the RPL table structure of the present embodiment can omit the field of End while declare the end of program execution in other manners. For example, when the field of REP_ID is used as Jump_ptr, the present embodiment can also use Jump_ptr to direct to the current entry itself, or use Jump_ptr being "Null" to indicate the declaration of the end of the program execution, but the present declare is not limited thereto.

In conclusion, the RPL table structure for multicast packet replication provided by the embodiment of the present disclosure can configure the current entry with the next entry immediately next to the current entry as one list, and can use Jump_ptr and Call_ptr to achieve entry-sharing. Therefore, compared to the existing RPL table structure, the present disclosure improves the usage efficiency of the RPL table structure, and also reduces the limitations for the entry-sharing.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A multicast packet replication method, comprising:
configuring a switch to read a plurality of entries of a replication list table according to an indicator to replicate a plurality of packets respectively corresponding to a plurality of headers, each of the entries including a first field, a second field, a third field, and a fourth field, wherein for each of the entries, the first field is used only to declare whether corresponding entry is an end of a program execution, the third field is preset to a first type field for indicating the switch how to modify a header of one of the packets, the second field is used to declare the fourth field as the first type field or a second type field for indicating the switch to jump to another entry of the entries to read the another entry; and
after the switch modifies the header of one of the packets according to the fourth field of a first entry of the entries, configuring the switch, in response to the first field of the first entry declaring that the first entry is not the end of the program execution, to continue to read a next entry immediately next to the first entry.

2. The multicast packet replication method according to claim 1, wherein the second field is further used to declare the fourth field as the first type field, the second type field or a third type field for indicating the switch to call a second entry of the entries to read the second entry.

3. The multicast packet replication method according to claim 2, further comprising: after the switch calls the second entry according to the fourth field of the first entry and modifies the header of one of the packets according to the fourth field of the second entry, configuring the switch, in response to the first field of the second entry declaring that the second entry is the end of the program execution, to return to read the next entry immediately next to the first entry.

4. The multicast packet replication method according to claim 3, wherein the second field is further used to declare the third field and the fourth field as the third type field and the second type field, respectively.

5. The multicast packet replication method according to claim 4, wherein, when the second field of the first entry declares the third field and the fourth field as the third type field and the second type field, respectively, the third field is used to indicate the switch to call a third entry of the entries to read the third entry, and after the switch modifies the header of at least one of the packets according to the third entry, the switch jumps to the another entry indicated by the fourth field of the first entry.

* * * * *